Nov. 8, 1949 W. J. FIEGEL ET AL 2,487,699
BROACHING MACHINE
Filed Jan. 31, 1945 6 Sheets-Sheet 1
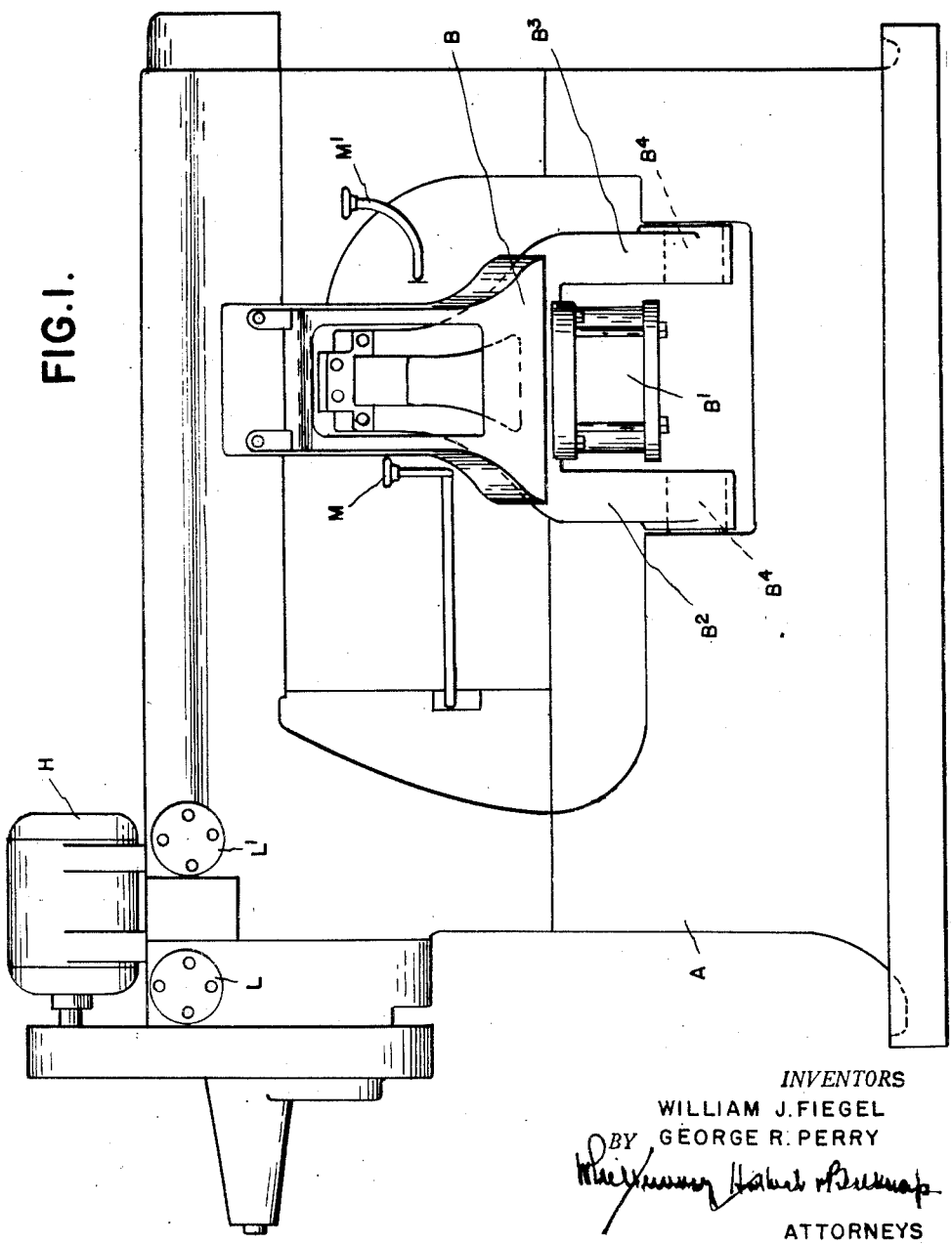
INVENTORS
WILLIAM J. FIEGEL
GEORGE R. PERRY
BY
ATTORNEYS

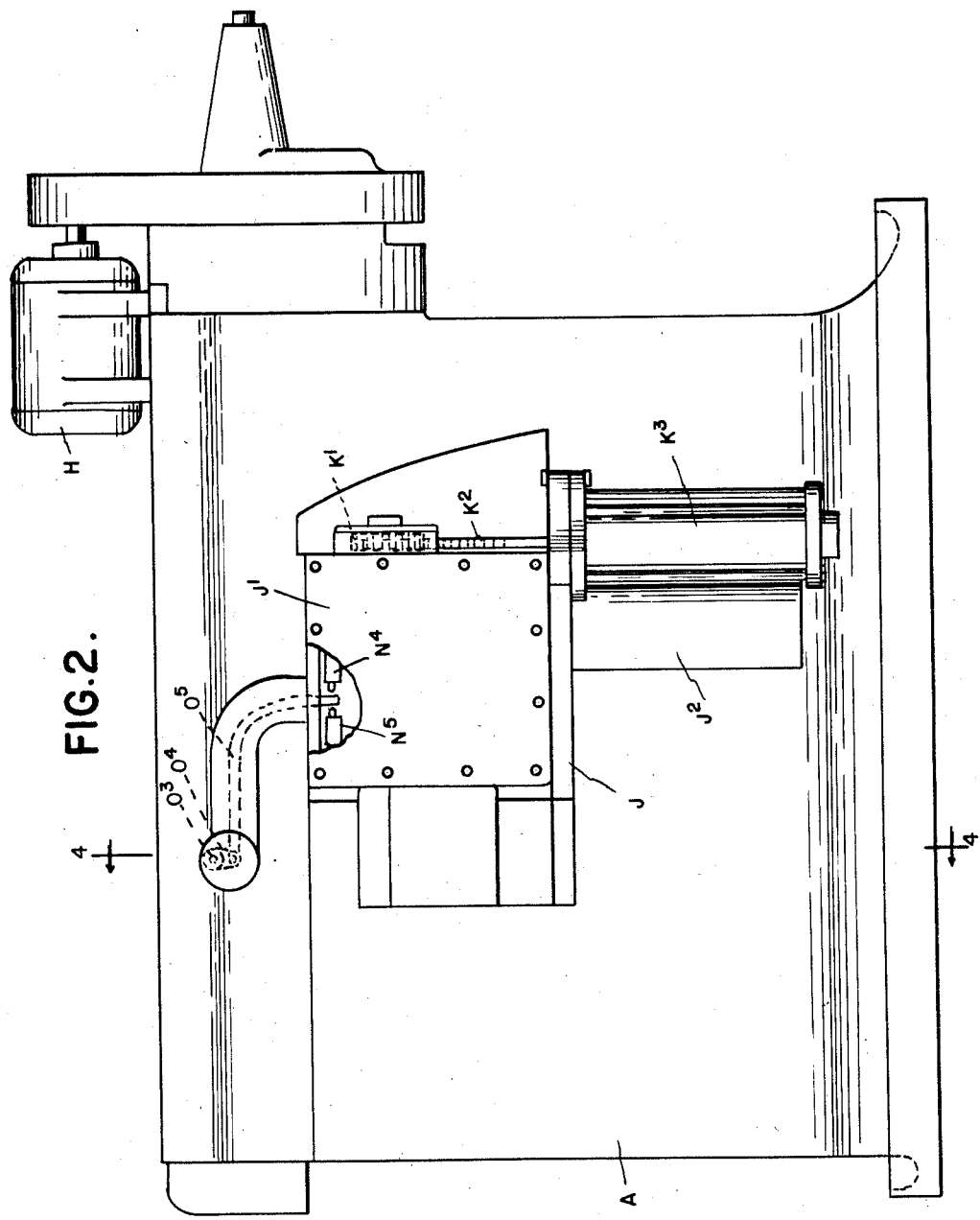

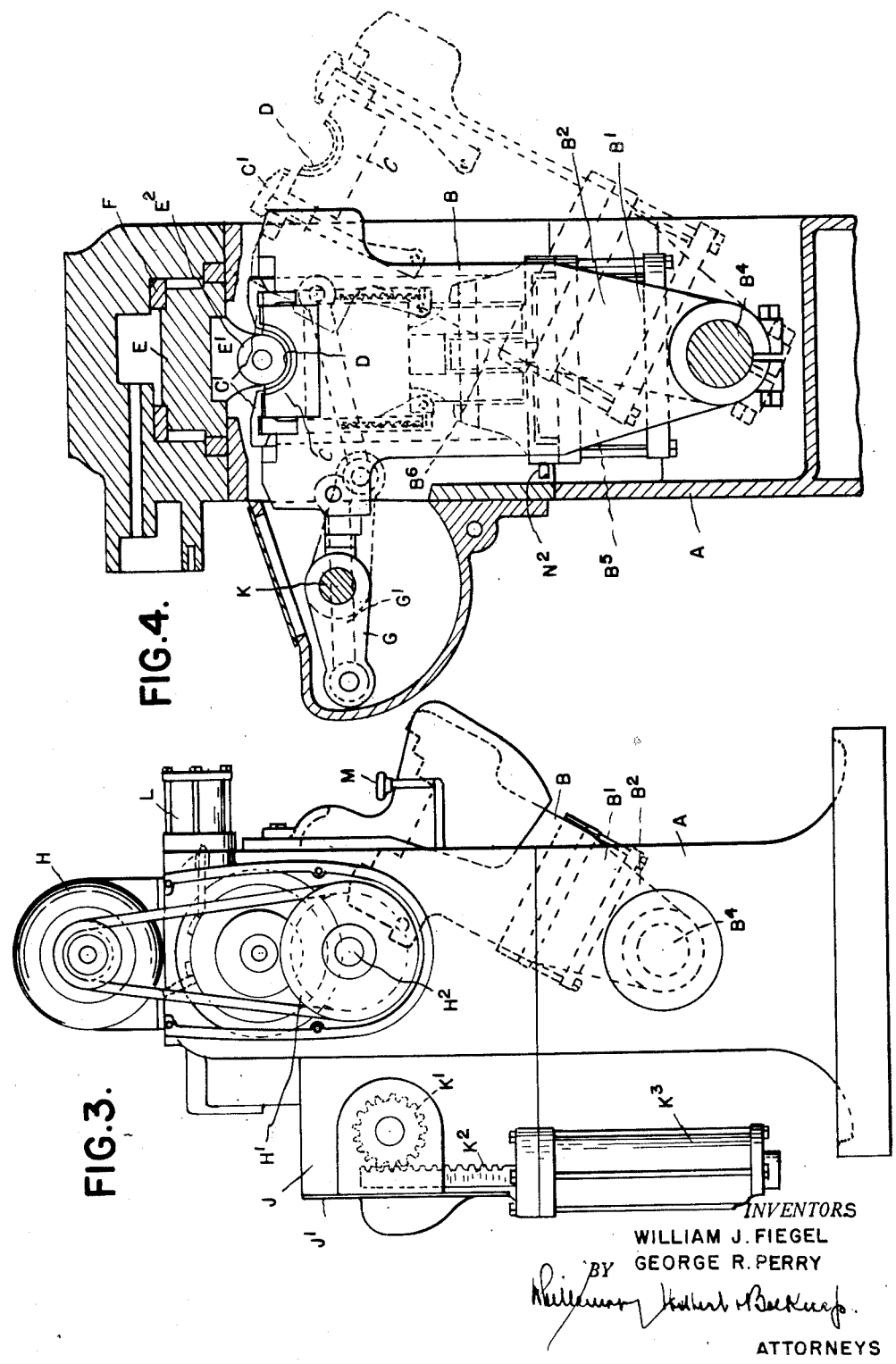

Nov. 8, 1949 W. J. FIEGEL ET AL 2,487,699
BROACHING MACHINE
Filed Jan. 31, 1945 6 Sheets-Sheet 4
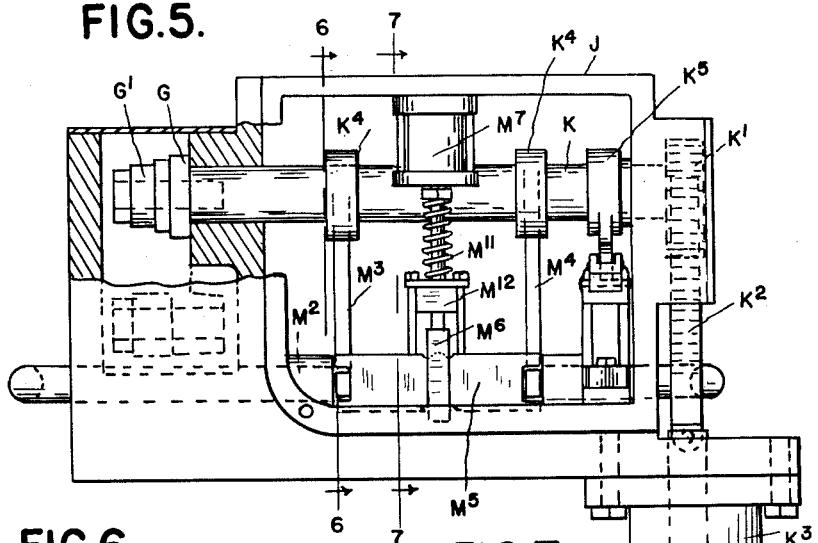
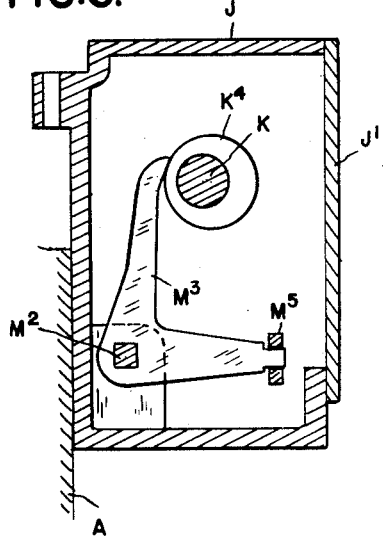
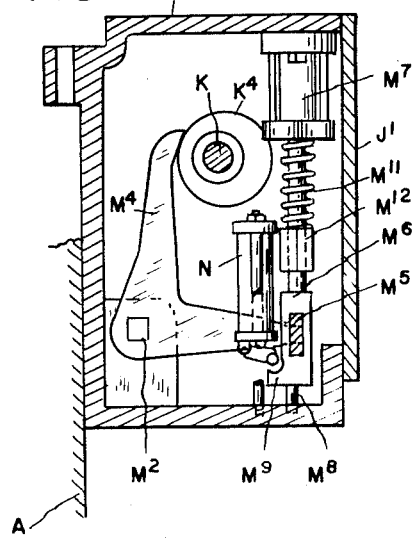
INVENTORS
WILLIAM J. FIEGEL
BY GEORGE R. PERRY
ATTORNEYS

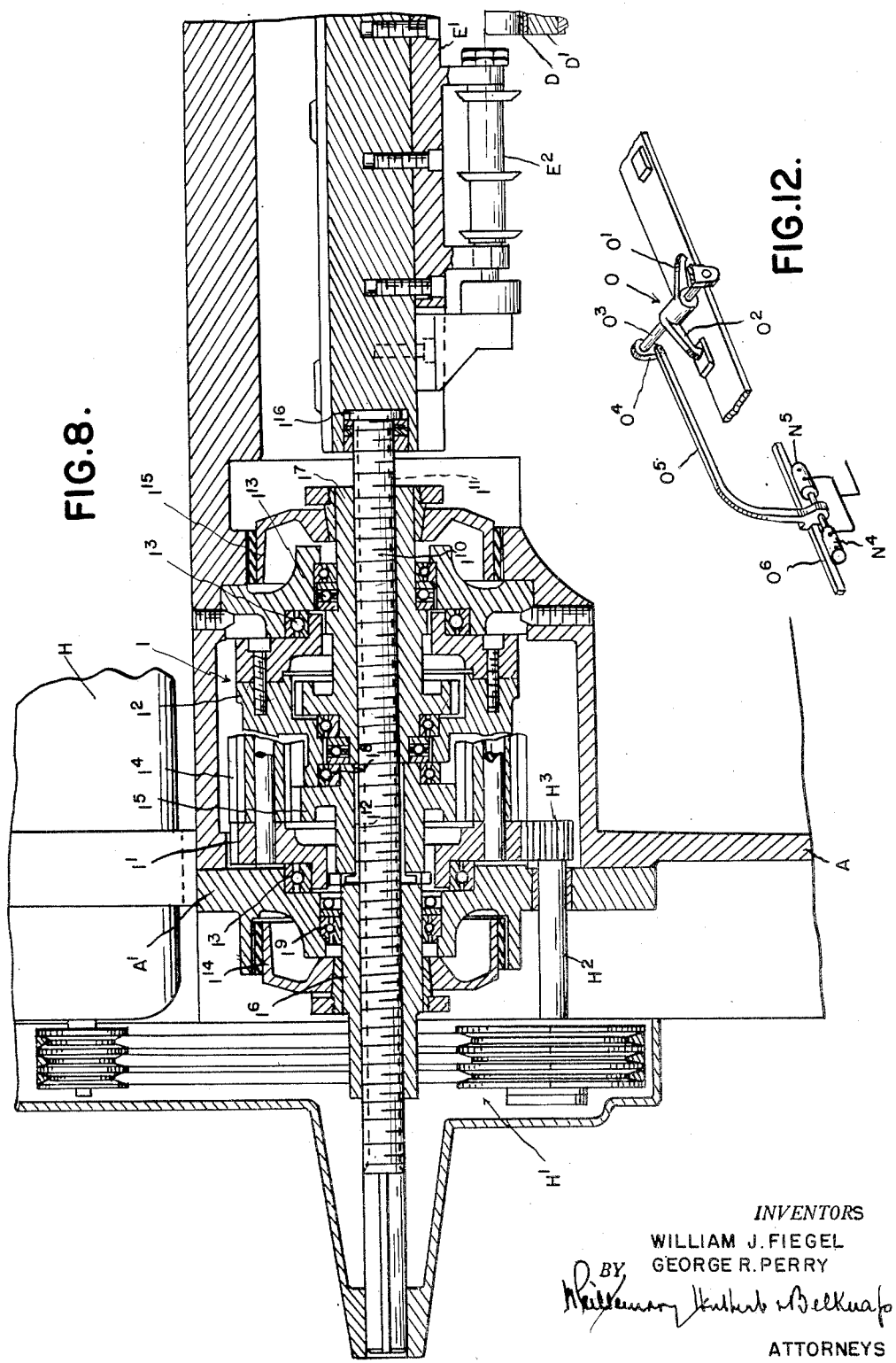

Nov. 8, 1949 W. J. FIEGEL ET AL 2,487,699
BROACHING MACHINE
Filed Jan. 31, 1945 6 Sheets-Sheet 6
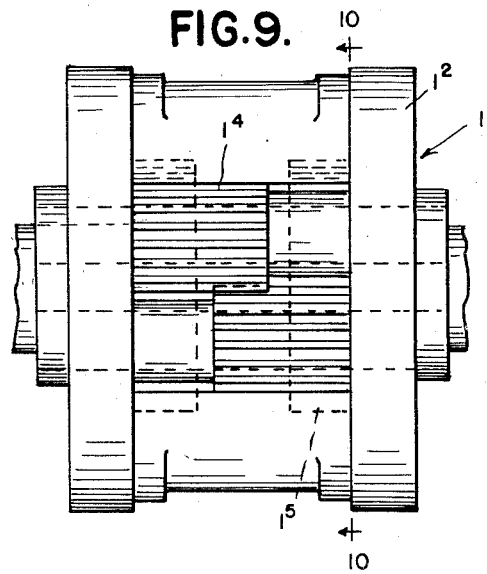
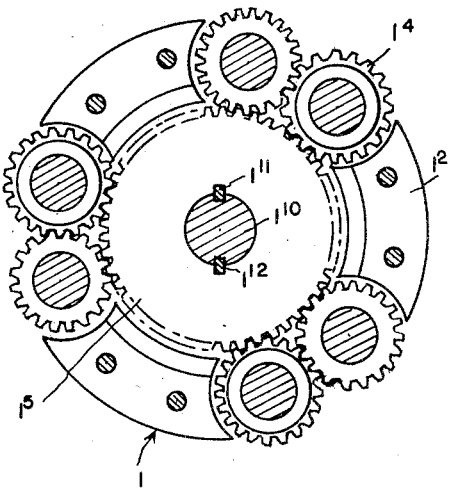
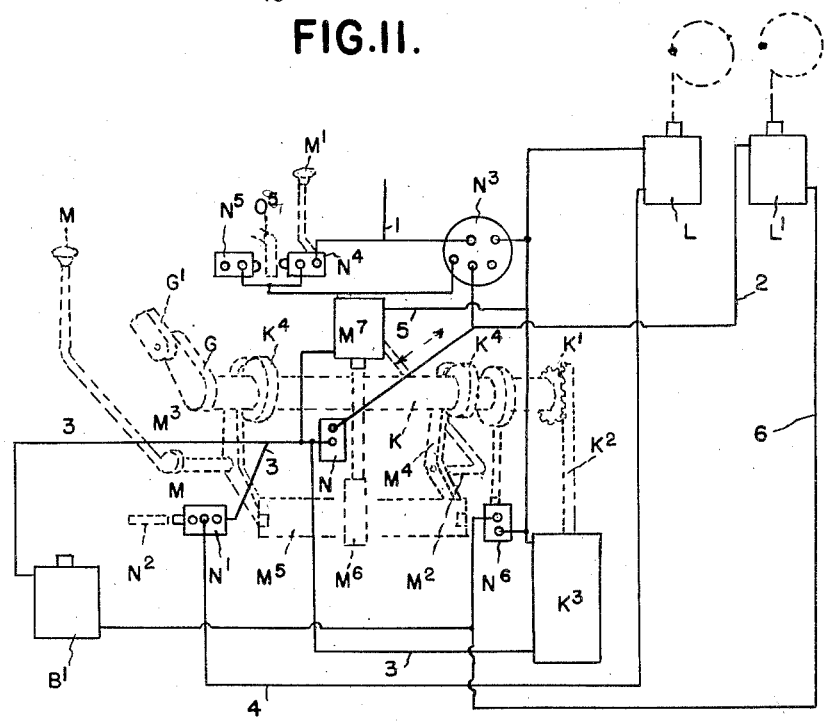
INVENTORS
WILLIAM J. FIEGEL
GEORGE R. PERRY
BY
ATTORNEYS Patented Nov. 8, 1949

2,487,699

UNITED STATES PATENT OFFICE 2,487,699

BROACHING MACHINE

William J. Fiegel and George R. Perry, Detroit, Mich., assignors to Bohn Aluminum & Brass Corporation, Detroit, Mich., a corporation of Michigan Application January 31, 1945, Serial No. 575,373

8 Claims. (Cl. 90—33)

The invention relates to broaching machines and more particularly to a construction adapted for use in the broaching of bearing liners to size the same.

It is the object of the invention to obtain a simple construction of machine which performs its work with great accuracy and which does not require a high degree of skill on the part of the attendant.

It is a further object to guard the attendant against any injury by the machine during its operation. With these objects in view the invention consists in various features of construction as hereinafter set forth.

In the drawings:

Fig. 1 is a front elevation of the machine;

Fig. 2 is a rear elevation thereof;

Fig. 3 is an end elevation with cover removed;

Fig. 4 is a section on line 4—4, Fig. 2;

Fig. 5 is a rear elevation partly in section showing the casing for the valves with the cover removed;

Fig. 6 is a section on line 6—6, Fig. 5;

Fig. 7 is a section on line 7—7, Fig. 5;

Fig. 8 is a longitudinal section showing the carriage, broach and planetary transmission mechanism for actuating the same;

Fig. 9 is an elevation of the cage member for the planetary transmission;

Fig. 10 is a section on line 10—10, Fig. 9;

Fig. 11 is a diagram showing the air motors, the valves and operating connections;

Fig. 12 is a diagrammatic perspective view of the mechanism for operating the valves $N^4$ and $N^5$.

As above stated, our improved machine is particularly designed for use in the finishing and sizing of bearing liners so that they axactly correspond to the journals for which they are intended. These bearing liners are usually formed of semi-cylindrical shape with an outer shell of rigid material, such as steel and a comparatively thin inner layer of bearing metal. The inner surface of the layer as originally formed is of a radius slightly smaller than that of the journal and must be sized to correspond to the same by a finishing operation. With our improved machine this finishing operation is accomplished by broaching and it is essential that the work should be exactly positioned in relation to the broach before the latter performs its function. If, however, this positioning of the work were manually performed, it would require skill on the part of the workman and there would also be danger of injury to his hand or hands through some carelessness on his part. It is, therefore, one of the features of the invention that the work holder in which the work is first introduced is normally in a position removed from the operating mechanism where it is readily accessible to the attendant. It is a further feature that the machine cannot be set in operation until the hands of the attendant are removed from proximity to this work holder. This will avoid all danger of catching either hand during the movement of the holder into the body of the machine and into alignment with the broaching mechanism. Furthermore, after the completion of the broaching operation which is automatically performed, the work holder is returned to its normal position where it remains stationary during the completion of the cycle. Thus, the finished bearing may be removed from the holder without any danger to the attendant.

General construction

In general construction the machine comprises a frame A and a rockable member B pivotally supported at its lower end in said frame and adapted to swing outward therefrom so that its upper end portion is normally clear of the frame. On this upper portion is supported a die member C adapted to receive a bearing liner, such as D. Within the upper portion of the frame is a carriage E travelingly supported on guideways F and adapted to be reciprocated thereon between positions on opposite sides of the rockable member B. Depending from the carriage E is a holder E' for a broach $E^2$ and the latter is so positioned that during the travel of the carriage on its ways, the broach will operatively engage the bearing liner D in the die holder C to size and finish said liner. The sequence of operation of the elements thus far described is, first, the rocking of the member B from its outer to its inner position; second, the movement of the carriage and broach so that the latter performs its broaching operation on the work; and, third, the rocking of the member B to its outer position where the finished liner may be removed from the die holder and another liner inserted therein.

Rockable work carrier

The member B as above described forms a work carrier between the positions where the work is engaged and removed from the die holder to the position where it is in alignment with the broach. It is, however, necessary that the die holder C should be clear from any obstruction during the insertion or the removal of the work therefrom and also that the work should be firmly clamped in said holder during the broaching operation. This is accomplished by providing work clamping fingers C' normally clearing the diametrically opposite sides of the liner in the die but, which after the starting of the machine, are drawn down and moved oppositely inward to clamp the opposite edges of said liner. The actuating force for operating the fingers is an air cylinder B' mounted in the lower portion of the member B between furcations $B^2$ and $B^3$ thereof. These furcations engage pivot pins $B^4$ which are mounted in the frame A in alignment with each other. The piston $B^5$ in the cylinder B' is connected by rods $B^6$ with the fingers C' to actuate the same. As the specific construction of this clamping mechanism is not the subject matter of the instant invention, it will not be described more in detail. The rocking of the member B is accomplished by a crank G and connecting rod G', the operation of which will be later described.

Broaching mechanism

As above described, the broach $E^2$ is mounted to depend from the carriage E which latter travels along the ways F from a position at the left of the member B, Fig. 1, to a position at the right of said member. The actuation of the carriage is accomplished by the following mechanism. H is an electric motor mounted on the frame A and connected by a step-down pulley and belt transmission H' with a shaft $H^2$. The latter has mounted thereon a pinion $H^3$ which is in mesh with a gear wheel I' of a planetary transmission I.

Planetary transmission

This planetary transmission includes a cage member $I^2$ having the gear I' at one end thereof, said cage member being supported by ball bearings $I^3$ at opposite ends thereof engaging a portion A' of the frame A. Journaled in the cage are pairs of elongated pinions $I^4$, which have overlapping portions in mesh with each other. The outer end portions of said pinions are in mesh with sun gears $I^5$ which are formed integral with aligned hollow shaft members $I^6$ and $I^7$. These are supported by ball bearings $I^8$ and $I^9$ respectively in the cage member $I^2$ and the frame portion A'. Within the hollow shaft members $I^6$ and $I^7$ is a shaft member $I^{10}$, a portion of which is screw threaded to engage a corresponding internal screw thread in the shaft member $I^7$. The portion of the shaft $I^{10}$ which extends through the member $I^6$ has a spline groove $I^{11}$ therein engaged by a spline $I^{12}$ in the member $I^6$. The arrangement is such that the shaft member $I^{10}$ is rotatively fixed but axially movable within the hollow shaft member $I^6$, while any relative rotation of the threaded portion of the shaft $I^{10}$ with respect to the internally threaded member $I^7$ will cause an axial advancement of the former. End thrust bearings $I^{13}$ hold the members $I^6$ and $I^7$ from axially displacement with respect to each other and the frame member A'. The shaft member $I^6$ has mounted thereon a brake head $I^{14}$ and the shaft member $I^7$, a brake head $I^{15}$, which in cooperation with brakes hereinafter described, will alternatively arrest rotation of said members. Thus, assuming that both brakes are released, all of the rotary members of the transmission as above described including the shaft $I^{10}$, will revolve as a unit and without any axial movement of said shaft. If, however, the brake is applied to the brake head $I^{14}$ thereby holding the member $I^6$ from rotation, this through the spline $I^{12}$ will arrest rotary movement of the shaft $I^{10}$; also, the member $I^6$ together with the integral sun gear $I^5$ thereof being stationary. This through the intermeshing planetary pinions will communicate rotary movement to the shaft member $I^7$ at twice the speed of the rotary cage member $I^2$. This, in turn, will cause the axial advancement of the shaft member $I^{10}$ by the threaded engagement between the same and the member $I^7$. On the other hand, if the brake is released from the brake head $I^{14}$ and the brake applied to the brake head $I^{15}$, this will hold the member $I^7$ from rotation, while rotary movement at twice the speed of that of the cage member I' will be communicated to the shaft member $I^6$ and shaft $I^{10}$. This, by reason of the threaded engagement, will cause a return movement of the shaft member $I^{10}$. In brief, the braking of the head $I^{14}$ will cause a forward axial advancement of the shaft member $I^{10}$ and the braking of the head $I^{15}$ will cause a return movement of said shaft, while the releasing of both brake heads will permit the shaft to revolve without any axial movement thereof.

The shaft $I^{10}$ has at its forward end a head $I^{16}$ which has a swivel engagement with the carriage E. Consequently, any axial movement imparted to the shaft $I^{10}$ will cause a corresponding movement of the carriage E along the ways F which, in turn, will cause the broach $E^2$ to pass through the work finishing and sizing the same. The rockable member B is then swung outward after which a return movement of the carriage will restore it to its original position.

Operating and control mechanism

For operating the rockable member B and for actuating the brakes of the transmission mechanism, we preferably employ individual air cylinders or pneumatic motors. These are controlled and timed in their operation by valves and actuating mechanism therefor, which will now be described. Mounted on the rear side of the frame of the machine is a casing J provided with a removable rear cover J'. A rock shaft K extends longitudinally through this casing and out through the end walls thereof. At one end of this rock shaft is a gear wheel K' which is in mesh with a vertically extending rack member $K^2$ connected at its lower end with the plunger of an air cylinder $K^3$ secured to a bracket on the casing J. Secured to or formed integral with the opposite end portion of the shaft K is the crank arm G which, as previously described, is connected by the rod G' with the rockable member B. Thus, the movement of the plunger in the air cylinder $K^3$ will through the rack $K^2$ and gear wheel K' rock the shaft K through a predetermined angle preferably something less than 180°. This will rock the member B from its outer to its inner position and upon a reverse actuation of the plunger, will return said member B to its outer position.

The brakes for arresting movement of the brake heads $I^{14}$ and $I^{15}$ are each preferably formed by a strap surrounding the head and pressed into frictional engagement therewith by the operation of an air cylinder. The air cylinders L and L' are mounted at the front and upper end of the frame A, the one operating the brake for the brake head $I^{14}$ and the other, for the brake head $I^{15}$. All of these air cylinders, together with the cylinder B' previously mentioned, are supplied with air through tubing extending thereto from valves which are located within the casing J. The object of placing the valves all within an enclosed casing is to avoid the noise which would otherwise be produced by the exhausting of air each time an air cylinder is operated. Thus, all of the exhaust air first enters the chamber within the casing J from which it gradually escapes through a muffler $J^2$, which largely eliminates the noise. The valves are controlled in their operation to actuate the various air cylinders in proper sequence by mechanism also partly enclosed within the casing J and which is of the following construction.

*Control mechanism*

It has been stated as one of the objects of the invention to protect the workman or attendant of the machine from possible injury. One source of danger might be the starting of the mechanism before removal of the hands from proximity to the work holder in which the work is manually inserted. Such danger is avoided by requiring both hands to operate controls for starting the machine, said controls being clear of any moving part of the mechanism. As specifically shown, two handles M and M' are located on opposite sides of the rockable member B in its outer position and in front of the frame of the machine. The shanks of these handles extend to the rear of the frame on opposite ends of the casing J and each is connected to a rock shaft $M^2$ extending through the wall of said casing. Within the casing J the rock shafts $M^2$ are connected to bell crank levers $M^3$ and $M^4$. One arm of each bell crank lever extends horizontally into engagement with a notched end of a coupling bar $M^5$ which at its center has an arcuate portion engaging a slot in a vertically extending bar $M^6$. The upper end of the bar $M^6$ is connected to the plunger of an air cylinder $M^7$, while at its lower end it has a guide pin $M^8$ slidably engaging a bearing in the casing. The member $M^6$ is further provided with a lateral arm $M^9$ which extends beneath the operating member of an air valve N with sufficient clearance therebetween to permit a limited upward movement of said member $M^6$ without operating the valve. This clearance is sufficient so that the raising of either end of the coupling bar $M^5$ by operation of the corresponding handle M or M' will not operate the valve but, if both ends of the coupling bar are simultaneously raised, this will lift the member $M^6$ sufficiently to actuate the valve N. The valve N controls supply of air, first, to the cylinder $M^7$ to actuate the plunger thereof and hold the bar $M^6$ in its raised position after the operating handles M and M' are released. Air is also supplied from said valve N to the cylinder B' on the rockable member B thereby operating the clamping mechanism which retains the work in its die holder. Still further air is supplied from said valve to the cylinder $K^3$ and through the mechanism previously described, rocks the shaft K and crank G to move the rockable member B to its inner position. The air for operating the cylinder L is also supplied through the valve N but it is further controlled by a valve N' which is closed during the inward rocking movement of B. At the completion of this movement the member B presses against a rod $N^2$ passing through the front wall of the casing J and operating the valve N'. This admits air to the cylinder L, the plunger of which applies the brake to the break head $I^{14}$ thereby stopping the rotation of the member $I^6$ and shaft $I^{10}$ and simultaneously accelerating the rotation of the member $I^7$. The latter by its screw thread engagement with the shaft $I^{10}$ will move said shaft together with the carriage E and broach $E^2$ in a forward direction to perform the broaching operation on the work.

To complete the cycle the member must be rocked outward and the carriage E returned to its initial position. Such operations are accomplished by a master valve $N^3$, pilot valves $N^4$ and $N^5$ for reversing the same and a valve $N^6$, all being located within the casing J. The pilot valves $N^4$ and $N^5$ are mechanically actuated by movement of the carriage E through the medium of the following mechanism. O is a rocker mounted on the frame A above the path of the carriage E. This rocker has two arms O' and $O^2$ extending on opposite sides of the axis thereof and in different planes. The rocker is mounted on a shaft $O^3$ which extends through the rear wall of the frame A and has at its rear end a rock arm $O^4$. This is pivotally connected to a curved rod $O^5$ which extends downward into the casing J with its lower end portion slidably engaging a guideway $O^6$ on the wall of said casing. The pilot valves $N^4$ and $N^5$ are on opposite sides of this end portion of the rod $O^5$ so that movement of said rod in one direction along the guideway $O^6$ will actuate one of the pilot valves, while movement in the opposite direction will actuate the other pilot valve. The rod $O^5$ is enclosed in a casing member $J^4$ which covers the opening into the casing J through which said rod passes and thus maintains the air seal. The arms O' and $O^2$ of the rocker O are actuated respectively by projections $O^7$ and $O^8$ on the carriage E, the arrangement being such that near the completion of the forward movement of said carriage, the projection $O^7$ will actuate the rocker arm O'; and near the completion of the return movement of said carriage, the projection $O^8$ will actuate the arm $O^2$. The rocking of the member O is communicated through the shaft $O^3$ to the rock arm $O^4$ and from the latter to the rod $O^5$ as previously described. Thus, when the rocker is actuated at the completion of the forward movement of the carriage, this will cause the rod $O^6$ to actuate the pilot valve $N^4$ which will reverse the master valve $O^3$. On the other hand, when the rocker is actuated at the completion of the return movement of the carriage, the same mechanism will actuate the pilot valve $N^5$ to restore the master valve to its original position.

*Air connections between the valves and cylinders*

The sequence of operation is indicated in the diagram, Fig. 11. In this figure, 1 is the conduit for supplying compressed air which leads to the pilot valve $N^4$ and also to the master valve $N^3$. In the normal position of the master valve, air from the conduit 1 passes through said valve to a conduit 2 leading to the upper end of the cylinder L'; also to the valve N and from the latter through a conduit 3 to the lower end of the cylinder $M^7$, the upper end of the cylinder B', lower end of cylinder $K^3$ and to the valve N'. From the valve N' a conduit 4 leads to the lower end of the cylinder L. In the reverse position of the master valve air is cut off from the conduit 2 and is supplied to a conduit 5 which leads to the upper end of the cylinder $M^7$ to the upper end of the cylinder K³, to the upper end of the cylinder L and to a valve N⁶. The valve N⁶ controls the passage of air to a conduit 6 leading to the lower end of the cylinder B' and also to the lower end of the cylinder L'. Thus the conduits to all of the cylinders outside of the casing J also include return conduits from said cylinders into the casing and to the valves so that all exhausted air will be within the casing and must pass outward therefrom through the muffler.

Sequence of operations in the cycle

In the operation of the machine the electric motor H is in constant operation and rotates the planetary transmission including the shaft I¹⁰. However, this shaft is not moved axially until after the start of a cycle. Normally the member B is in its outer position and the clamping mechanism for the work is released so that the attendant can easily insert a bearing to be broached into the die holder. He can not, however, start the cycle until his hands are removed from proximity to the work holder to grasp the handles on opposite sides thereof. If both handles M and M' are simultaneously depressed, this will start the cycle with the following sequence of operations. The depression of the handles will rock the shafts M² and actuate the bell crank levers M³ and M⁴ which, if both are simultaneously operated, will lift the coupling bar M⁵ a sufficient distance to operate the valve N. This supplies air to the locking air cylinder M⁷, the clamping cylinder B' and the cylinder K³, which latter rocks the member B inward to carry the work into operative relation to the broaching mechanism. At the completion of the inward movement of the member B, it will actuate the valve N' which supplies air to the brake cylinder L and applies the brake to the brake head I¹⁴ thereby arresting rotation of the shaft I¹⁰. This will also cause rotation of the threaded hollow shaft member I⁷ which will impart axial movement to the shaft I¹⁰ and from the latter to the carriage E. This will pass the broach E² through the work sizing and finishing the same. Near the completion of the forward movement of the carriage E the projection O⁷ will actuate the rock arm O' and through the mechanism previously fully described, will actuate the pilot valve N⁴ which will cause the reversal of the master valve N³. Air is thus cut off from the conduits 2, 3 and 4 and the ends of cylinders K³, B' and M⁷ supplied thereby and is supplied through the conduit 5. The cylinder M⁷ operates to return the members which were raised by the operation of the handles M and M' but this return movement is controlled by cams K⁴ on the rock shaft K which engage the upwardly extending arms of the bell crank levers M³ and M⁴ and permit only gradual return movement thereof. A spring M¹¹ sleeved on the rod M⁶ between the cylinder K and a shoulder M¹² on said rod serves to yieldably hold said rod down when air pressure is released. The cylinder L releases the brake on the brake head I¹⁴ and stops the carriage. The cylinder K³ operates to return the member B to its outer position and this must be accomplished in advance of the return movement of the carriage E and broach E². Such delay is effected by interposing the air valve N⁶ between the conduit 5 and the conduit 6. This valve is operated by a cam K⁵ on the rock shaft K which after sufficient movement of said rock shaft to clear the work holder on the member B from the path of the broach will actuate said valve N⁶ and supply air to the lower ends of the cylinders B' and L'. The cylinder B' operates to release the clamp for the work, while the cylinder L' applies the brake to the brake head I¹⁵ thereby stopping rotation of the member I⁷ and in imparting rotary movement to the member I⁶. The screw threaded engagement of these two members will then effect a return axial movement of the shaft I¹⁰ which will also return the carriage E. The final operation of the cycle is the reversal of the master valve N³ which is accomplished by the projection O⁸ on the carriage operating the arm O² of the rocker O and through the connecting mechanism actuating the pilot valve N⁵ which, in turn, operates the master valve. This cuts off the air supply to the conduits 5 and 6 and the air cylinders M⁷, B', L and L' supplied thereby, which is the condition of these members prior to the start of the cycle. The motor H and the transmission I continue to revolve but without imparting any movement to the carriage E until the handles M and M' are again simultaneously operated.

What we claim as our invention is:

1. In a broaching machine, the combination with a frame and a broach carriage mounted for reciprocation thereon, of means for holding said carriage stationary or propelling it in either of opposite directions comprising a rod having a swivel coupling with said carriage, a pair of sleeves on said rod, one having a threaded engagement therewith and the other rotatively coupled therewith but axially free, means for holding said sleeves against displacement axially of said frame, a differential gearing for simultaneously rotating both sleeves, a brake for each sleeve to arrest rotation thereof, a work carrier pivotally connected to said frame to be rockable transversely thereof from a position without the frame to a position for registering the work with the broach, a plurality of fluid motors for respectively rocking said carrier and actuating each of said brakes, controlling valves for said motors, and means for actuating said valves to effect the following sequence of operations: inward movement of the carrier, forward movement of the carriage, outward movement of the carrier, return movement of the carriage.

2. In a broaching machine, the combination with a frame and a broach carriage mounted for reciprocation thereon, of means for holding said carriage stationary or propelling it in either of opposite directions comprising a rod having a swivel coupling with said carriage, a pair of sleeves on said rod, one having a threaded engagement therewith and the other rotatively coupled therewith but axially free, means for holding said sleeves against displacement axially of said frame, a differential gearing for simultaneously rotating both sleeves, a brake for each sleeve to arrest rotation thereof, a work carrier pivotally connected to said frame to be rockable transversely thereof from a position without the frame to a position for registering the work with the broach, a holder for the work on said carrier, clamping means for the work in said holder, a plurality of fluid motors for respectively rocking said carrier, operating said clamping means and actuating each of said brakes, valves for controlling said motors, and means for actuating said valves to effect operations in the following sequence: clamping the work, rocking said carrier from its outer to its inner position, move said carriage forward, return movement of said carrier, return movement of said carriage.

3. In a broaching machine, the combination with a frame and a broach carriage mounted for reciprocation thereon, of means for holding said carriage stationary or propelling it in either of opposite directions comprising a rod having a swivel coupling with said carriage, a pair of sleeves on said rod, one having a threaded engagement therewith and the other rotatively coupled therewith but axially free, means for holding said sleeves against displacement axially of said frame, a differential gearing for simultaneously rotating both sleeves, a brake for each sleeve to arrest rotation thereof, a work carrier pivotally connected to said frame to be rockable transversely thereof from a position without the frame to a position for registering the work with the broach, a plurality of fluid motors, one for rocking said carrier and one for actuating each of said brakes and controlling valves for said motors including a manually operated valve for rocking said carrier to its work registering position, a valve operated by said carrier at the completion of said rocking movement for actuating the brake motor which arrests movement of the threaded sleeve thereby causing the forward movement of said carriage, a valve actuated by said carriage at the completion of its forward movement for releasing said brake and also return rocking said carrier, and a valve operated during the return movement of said carrier for applying the other brake to cause the return movement of said carriage.

4. The combination with a hollow frame, of a carriage mounted for reciprocation longitudinally within said frame, a broach mounted on said carriage, a work carrier pivotally mounted in said frame to be rockable transversely thereof from a position without to a position within the same, a work holder on said work carrier with which the work may be manually engaged and from which the finished work may be manually removed in the outer position of said carrier, means for actuating said work carrier and carriage in sequence, and starting means for said actuating means operable only by two hands and when in spaced positions safely removed from moving parts of the mechanism.

5. The combination with a hollow frame, of a carriage mounted for reciprocation longitudinally within said frame, a broach mounted on said carriage, a work carrier pivotally mounted in said frame to be rockable transversely thereof from a position without to a position within the same, a work holder on said work carrier with which the work may be manually engaged and from which the finished work may be manually removed in the outer position of said carrier, means for actuating said work carrier and carriage in sequence, and starting means including a pair of spaced handles both of which must be simultaneously moved to actuate said actuating mechanism.

6. In a broaching machine, the combination with a frame, of a carriage mounted for reciprocation longitudinally of said frame, a broach mounted on said carriage, a work carrier pivotally connected to said frame to be rockable transversely thereof from a position without the frame to a position for registering the work with said broach, a work clamp on said carrier, a plurality of reciprocatory fluid motors for respectively rocking said carrier operating said clamping means and controlling the forward and reverse movement of said carriage, valves for controlling said motors including a master valve for reversing the direction of movement thereof, means for operating said valves in sequence to rock said carrier inward, clamp the work and move said carriage forward, and means actuated by said carriage at the completion of the forward movement thereof for actuating said master valve to reverse the direction of movements of said motors.

7. In a broaching machine, the combination with a frame, of a carriage mounted for reciprocation longitudinally of said frame, a broach mounted on said carriage, a work carrier pivotally connected to said frame to be rockable transversely thereof from a position without the frame to a position for registering the work with said broach, a work clamp on said carrier, a plurality of pneumatic motors for respectively controlling the reciprocation of said carriage and for actuating said rockable carrier and work clamp, a substantially closed casing mounted on said frame, valves in said casing for controlling said pneumatic motors, and conduits connecting said valves with said motors whereby the exhaust from each of said motors is discharged within said casing.

8. In a broaching machine, the combination with a frame, of a carriage mounted for reciprocation longitudinally of said frame, a broach mounted on said carriage, a work carrier pivotally connected to said frame to be rockable transversely thereof from a position without the frame to a position for registering the work with said broach, a work clamp on said carrier, a plurality of pneumatic motors for respectively controlling the reciprocation of said carriage and for actuating said rockable carrier and work clamp, a substantially closed casing mounted on said frame, valves in said casing for controlling said pneumatic motors, conduits connecting said valves with said motors whereby the exhaust from each of said motors is discharged within said casing, and automatic means for actuating said valves in sequence.

WILLIAM J. FIEGEL.
GEORGE R. PERRY.

REFERENCES CITED

The following references are of record in the file of this patent:

UNITED STATES PATENTS

| Number | Name | Date |
| --- | --- | --- |
| 1,463,899 | McKechnie | Aug. 7, 1923 |
| 1,590,238 | Gilman | June 29, 1926 |
| 1,626,924 | Eggenweiler et al. | May 3, 1927 |
| 1,938,233 | Vallone et al. | Dec. 5, 1933 |
| 2,305,900 | Roberts | Dec. 22, 1942 |
| 2,340,653 | Fiegel | Feb. 1, 1944 |

FOREIGN PATENTS

| Number | Country | Date |
| --- | --- | --- |
| 26,400 | Great Britain | Dec. 19, 1905 |
| 136,649 | Great Britain | Dec. 19, 1919 |
| 432,596 | Great Britain | July 30, 1935 |